Figure 1:
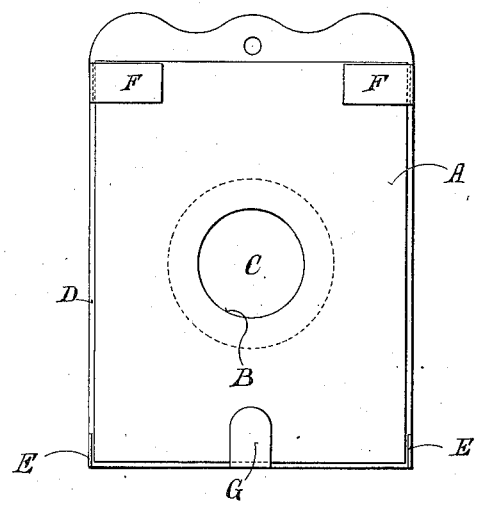

No. 850,849. PATENTED APR. 16, 1907.
W. H. POWER.
DISINFECTING TABLET.
APPLICATION FILED MAR. 22, 1906.

Witnesses:
Dennis Sumby
C. D. Kesler

Inventor
Willoughby H. Power
By James L. Norris
Atty.

UNITED STATES PATENT OFFICE.

WILLOUGHBY HAMILTON POWER, OF LONDON, ENGLAND.

DISINFECTING-TABLET.

No. 850,849.  Specification of Letters Patent.  Patented April 16, 1907.

Application filed March 22, 1906. Serial No. 307,419.

*To all whom it may concern:*

Be it known that I, WILLOUGHBY HAMILTON POWER, a subject of the King of Great Britain, residing at London, England, have invented certain new and useful Improvements in Disinfecting-Tablets, of which the following is a specification.

This invention relates to solid deodorizers or disinfectants and to supports therefor.
Deodorizing and disinfecting tablets have heretofore been made from a mixture of materials, such as a base of naphthalene having disinfectant and odoriferous ingredients—for example, carbolic acid and eucalyptus-oil—
incorporated therewith. It has been found, however, in practice that in the cooling of such ingredients after fusion for the purpose of molding the same together with the base into pieces of commercially suitable form waste occurs through evaporation or volatilization. This waste is all the greater when the materials are made up in large quantities. Moreover, such mixed ingredients in some cases disseminate odors which are objectionable to particular individuals. Thus, for example, the odor of carbolic acid is objectionable to some people and that of eucalyptus-oil is objectionable to others, and a tablet containing one or other of such materials is therefore not universally acceptable. It is desirable, therefore, to counteract or disguise the smell of these ingredients and also of the base by the addition of agreeable scents. Ordinarily, however, a volatile scent added to the tablet would soon be dissipated and lost before the tablet itself is evaporated, and hence it is necessary to provide for retaining the scent so long as the tablet lasts. This constitutes one object of my invention and is accomplished as hereinafter described.

Another object of my invention is to use the ingredients above mentioned in a concentrated form in a separate piece from the main tablet, but used with the main tablet, which may be naphthalene, for example, alone. This separate piece or pieces may be changed or renewed at will.

According to the present invention, therefore, tablets or blocks of a solid volatile disinfectant substance—for example, naphthalene—are molded to the desired shapes and formed each with a hole or pocket or with holes or pockets for receiving separately-molded and interchangeable solid pieces.
These pieces consist of a suitable solid volatile substance—such as naphthalene, camphor, or menthol or of two or more of such substances combined with a suitable odoriferous gum or resin —*i. e.*, a balsam, such as balsam of Peru or balsam of Tolu—and a suitable perfume or scent—by way of example, otto or oil of cloves—to which may be added carbolic acid, eucalyptus-oil, or other volatile disinfectants. The said molded pieces may be of an ornamental design, and any convenient method of making them may be adopted—for example, the same may be pressed in a cold state, or the following method may be employed—that is to say, measured quantities of the materials may be placed in molds, which are then heated in a closed chamber to effect fusion of the materials and subsequently cooled. The pressure of the atmosphere in the closed chamber may be raised to check evaporation or volatilization of the materials during heating, and the molds are allowed to remain in the closed chamber, if desired under pressure, until the cooling is effected and the molded materials have solidified. These pieces are scented differently to suit different individuals, and any desired piece may be used in connection with the tablet of naphthalene, thus providing the perfume or scent preferred by any individual purchaser.

In place of the removable solid piece suitably-shaped pieces of absorbent material may be employed, which can be saturated or impregnated with different liquid disinfectants suitably scented to suit different purchasers and used in combination with the naphthalene tablet or cups or the like may be used in lieu of absorbent material.

To provide a convenient means for suspending deodorizing or disinfecting tablets, the same have been heretofore placed in holders or frames, parts of which inclose the edges of such tablets and shield them from the atmosphere, so that when the central parts of such tablets have volatilized entirely the parts thereof protected by the holders or frames still remain and are usually wasted by being thrown away to permit fresh tablets to take the place of the used tablets. Even if the portions of the tablets inclosed by the frame are not thrown away they are of no use, as the volatilization is too slow to be effective. In order to prevent such waste and to secure uniform evaporation of the tablet, I mount my improved compound deodorizing and disinfecting block or tablet in a skeleton frame or on a backing of sheet metal, cardboard, or other material by means of wires, pins, clips, or holders, so that substantially the whole of the edges and the face of the tablet are equally exposed. By this arrangement the tablet volatilizes at a substantially uniform rate to an extremely thin sheet and finally disappears entirely.

Figure 2:
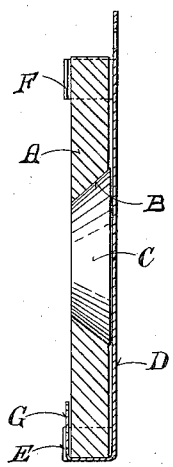

In the accompanying drawings, Figure 1 is a face view, and Fig. 2 is a vertical central section, of a tablet and holder constructed according to my invention.

A is the tablet, composed, for example, of naphthalene having a conical opening or pocket B formed therein for receiving a separate solid piece C adapted to fit in said pocket. The removable piece C is constituted of a base of naphthalene, camphor, menthol, or other suitable volatile substance combined with a suitable odoriferous gum or resin—i. e., a balsam, such as balsam of Peru or balsam of Tolu—and a suitable perfume or scent, to which may be added carbolic acid, eucalyptus-oil, or other volatile disinfectant. The following is an advantageous mixture for the purpose—viz., one hundred and twelve pounds of naphthalene, one hundred and thirty drams of balsam of Peru or balsam of Tolu, twelve drams perfume, and eighty drams of carbolic-acid crystals or eighty drams of eucalyptus-oil. I find that by adding the balsam (gum or resin) the scent is retained till the whole of the compound is volatilized, whereas if the gum or resin is omitted the scent is usually dissipated before the compound becomes wholly volatilized.

The tablet is shown carried in a holder consisting of a flat back D, of cardboard, thin metal, or other suitable material, furnished with corner-pieces E E at the bottom and F F at the top, and a center piece G at the bottom for supporting the tablet and keeping it in place. The tablet may, however, be molded with holes and be fastened to the backing by pins or otherwise. Moreover, in lieu of such a frame as that shown I may use a skeleton frame, the object being in all cases to support the tablet in such a manner that the face of the tablet and substantially the whole of the edges thereof are freely exposed to the air, so that in use the tablet may evaporate uniformly to a thin wafer and finally disappear.

The inserted piece C will be retained in place by the backing D and by the shape of the opening B; but, if desired, it can be readily secured to the tablet by passing a hot spatula around its periphery when in the tablet.

What I claim is—

A disinfectant comprising a block of naphthalene having an opening therein, in combination with an interchangeable perfuming-piece adapted to fit into said opening, said perfuming-piece being composed of naphthalene, a balsam, a phenol, and a perfume substantially as described.

In testimony whereof I have hereunto set my hand in the presence of two subscribing witnesses.

WILLOUGHBY HAMILTON POWER.

Witnesses:
GEO. HARRISON,
HENRY W. LYNDEN